US010233682B2

(12) United States Patent
Roth et al.

(10) Patent No.: US 10,233,682 B2
(45) Date of Patent: Mar. 19, 2019

(54) HOOD LATCH RELEASE HANDLE

(71) Applicant: GM GLOBAL TECHNOLOGY OPERATIONS LLC, Detroit, MI (US)

(72) Inventors: Justin J. Roth, Sterling Heights, MI (US); James M. Townson, Clarkston, MI (US); James N. Nelsen, Howell, MI (US); Ryan Calomeni, Richmond, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/677,657

(22) Filed: Aug. 15, 2017

(65) Prior Publication Data

US 2019/0055759 A1 Feb. 21, 2019

(51) Int. Cl.
*B62D 25/12* (2006.01)
*E05B 83/24* (2014.01)
*E05B 85/24* (2014.01)
*E05C 3/00* (2006.01)
*E05C 3/14* (2006.01)

(52) U.S. Cl.
CPC ............ *E05B 83/243* (2013.01); *B62D 25/12* (2013.01); *E05B 85/243* (2013.01); *E05C 3/004* (2013.01); *E05C 3/14* (2013.01)

(58) Field of Classification Search
CPC ...... E05B 83/24; E05B 83/243; E05B 83/247; E05B 85/243; E05C 3/14; E05C 3/004; B62D 25/12
USPC .................................................. 292/DIG. 14
See application file for complete search history.

(56) References Cited

U.S. PATENT DOCUMENTS

| 5,048,877 | A * | 9/1991 | Rogers, Jr. | E05B 83/24 |
| | | | | 292/110 |
| 6,149,210 | A * | 11/2000 | Hunt | E05B 83/16 |
| | | | | 292/216 |
| 6,666,483 | B2 * | 12/2003 | Baniak | E05B 83/24 |
| | | | | 292/123 |
| 2012/0280519 | A1 * | 11/2012 | Hong | E05B 83/24 |
| | | | | 292/128 |
| 2013/0221685 | A1 * | 8/2013 | Polewarczyk | E05B 83/243 |
| | | | | 292/52 |
| 2014/0054903 | A1 * | 2/2014 | Kim, II | E05B 83/24 |
| | | | | 292/96 |

(Continued)

*Primary Examiner* — Gregory A Blankenship
(74) *Attorney, Agent, or Firm* — Quinn IP Law (57) ABSTRACT

A mechanism configured to fasten a hood panel to a vehicle body for covering a vehicle under-hood compartment includes a pivotable latch. The latch has a primary catch portion that facilitates closure of the under-hood compartment via the hood panel. The latch also has a secondary catch portion that limits position of the hood panel within a predetermined distance from the vehicle body and generates an opening between the vehicle body and the hood panel. The latch additionally has a release handle that shifts into the opening to permit operator access to the release handle for releasing the secondary catch portion to uncover the under-hood compartment. The mechanism also includes a resilient element that selectively preloads the primary catch portion to facilitate closure of the under-hood compartment and preloads the secondary catch portion to limit the position of the hood panel within the predetermined distance from the vehicle body.

20 Claims, 5 Drawing Sheets

(56) References Cited

U.S. PATENT DOCUMENTS

| | | | | |
|---|---|---|---|---|
| 2014/0132011 | A1* | 5/2014 | Krishnan | E05B 83/247 |
| | | | | 292/217 |
| 2015/0102607 | A1* | 4/2015 | Kim, II | B62D 25/12 |
| | | | | 292/92 |
| 2017/0159330 | A1* | 6/2017 | Schiffer | E05B 77/08 |
| 2018/0066461 | A1* | 3/2018 | Nieto Avila | E05B 83/24 |
| 2018/0216366 | A1* | 8/2018 | Nottebaum | E05B 63/244 |

* cited by examiner

HOOD LATCH RELEASE HANDLE

INTRODUCTION

The disclosure relates to an articulating release handle for a hood latch of a motor vehicle.

In motor vehicles, a hood or bonnet is a moveable, typically hinged, panel configured to selectively cover and permit access to a compartment defined by the vehicle body. In vehicles with a front-mounted power-plant, the hood permits access to the power-plant for maintenance and repair. In vehicles with a rear-mounted power-plant, and in some vehicles with a mid-mounted power-plant, the hood covers a main storage compartment or trunk.

Commonly, a vehicle hood is held down by a concealed latch. Such a latch is generally designed to protect the vehicle or the compartment contents from theft, damage, and sudden opening of the hood while the vehicle is in motion. A hood release system is common on the most vehicles, and typically includes an interior compartment hood latch handle, a hood release cable, and a hood latch assembly. The hood latch handle is usually located for convenient access by the vehicle's operator. In such systems, when the hood latch handle is pulled, the release cable actuates the hood latch assembly, thus permitting the hood panel to be opened for access to the covered compartment.

SUMMARY

A mechanism configured to fasten a hood panel to a vehicle body for covering an under-hood compartment defined by the vehicle body includes a pivotable latch. The latch has a primary catch portion configured to facilitate closure of the under-hood compartment via the hood panel. The latch also has a secondary catch portion configured to limit a position of the hood panel within a predetermined distance from the vehicle body and thereby generate an opening between the vehicle body and the hood panel. The latch additionally has a release handle portion configured to be shifted into the opening between the vehicle body and the hood panel to provide access to the release handle portion by an operator and facilitate a release of the secondary catch portion to uncover the under-hood compartment via the hood panel. The mechanism also includes a first resilient element configured to selectively preload the primary catch portion to facilitate closure of the under-hood compartment and preload the secondary catch portion to limit the position of the hood panel within the predetermined distance from the vehicle body.

The primary catch and the secondary catch portions may be formed together as a first component. The release handle portion may be formed as a second component. Additionally, the first component may be fixed to and interconnected with the second component and thereby combined into a unitary latch structure.

The primary catch, the secondary catch, and the release handle portions may be formed together as a single, continuous latch structure.

The mechanism may include a limiter configured to define and restrict a range of motion of the latch and the release handle portion.

The mechanism may additionally include a striker configured to cooperate with the latch to selectively shift the release handle portion into the opening between the vehicle body and the hood panel. The latch may include a surface arranged between the primary and secondary catch portions and configured to guide the latch via contact with the striker to thereby position the release handle portion in the opening between the vehicle body and the hood panel. Furthermore, the release handle portion may be configured such that actuating the release handle portion shifts the secondary catch portion away from the striker.

The mechanism may also include a fork bolt configured to capture the striker and thereby fasten the hood panel to the vehicle body. The mechanism may additionally include a device configured to release the fork bolt and thereby free the hood panel to separate from the vehicle body by the predetermined distance and generate the opening between the vehicle body and the hood panel.

The mechanism may also include a second resilient element configured to apply a preload force directed to maintain the fork bolt in position to fasten the hood panel to the vehicle body.

The release handle portion may be shifted into the opening between the vehicle body and the hood panel automatically via release of the fork bolt.

A vehicle employing such a mechanism is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
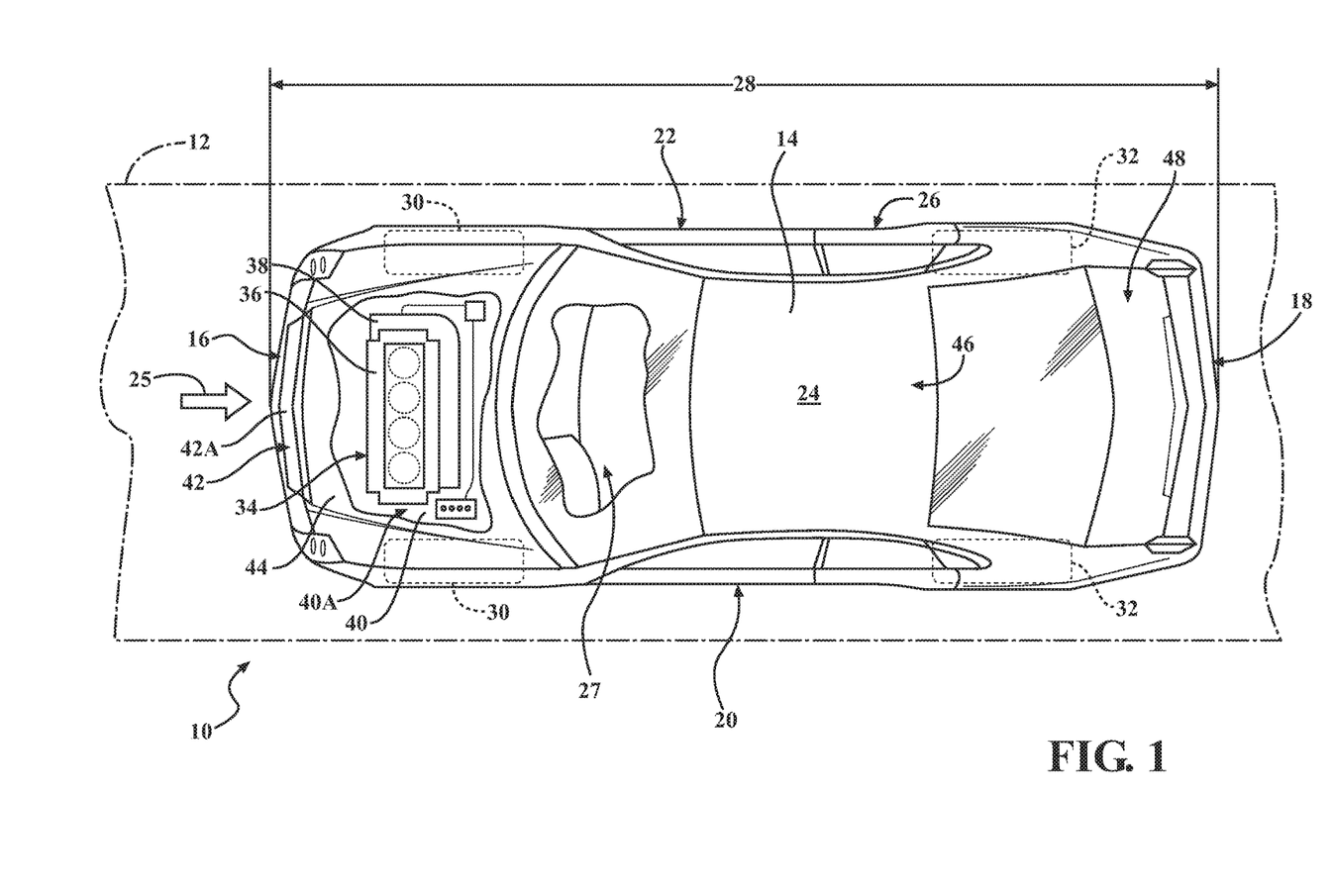
FIG. 1 is a schematic top view of a vehicle showing a partially sectioned hood panel and an underhood compartment covered thereby, according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 having a longitudinal axis X. The vehicle body 14 generally defines six body sides. The six body sides include a first body end or front end 16, an opposing second body end or rear end 18, a left side or section 20, and a right side 22, a top body section 24, and an underbody section 26. The front end 16 is configured to face oncoming or incident, i.e., approaching and contacting, ambient airflow 25, for example, when the vehicle is in motion relative to the road surface 12. The vehicle body 14 also defines a passenger compartment 27.

Each of the left side 20, right side 22, top, and underbody body sections, 20, 22, 24, and 26, respectively, is configured to span a distance 28 between the front and rear ends 16, 18 of the body 14. As shown in FIG. 1, the vehicle 10 also includes a plurality of road wheels arranged between the first and second vehicle body ends 16, 18, proximate the left and right sides 20, 22, specifically front wheels 30 and rear wheels 32. The vehicle 10 also includes a powertrain 34 that may include an internal combustion engine 36 for generating engine torque. The powertrain 34 may also include a transmission 38 operatively connecting the engine 36 to at least some of the road wheels 30, 32 for transmitting engine torque thereto and thereby put the vehicle 10 in motion.

The vehicle body 14 defines a compartment 40 for housing the powertrain 34. As shown, the vehicle body 14 also includes a vehicle fascia 42 arranged at the front end 16. The fascia 42 defines an opening 42A configured to receive at least some of the oncoming ambient airflow 25, which may be used for cooling the powertrain 34. The vehicle 10 also includes a hood panel or bonnet 44 configured to cover the compartment 40 and thereby define an underhood compartment 40A for housing the powertrain 34. The vehicle 10 may also include a vehicle roof 46 and a trunk lid 48. Although the powertrain 34 is shown as arranged proximate the front end 16, such that the vehicle 10 has a front-engine configuration, the powertrain 34 may, alternatively, be arranged proximate the rear end 18, such that the vehicle 10 has a mid- or rear-engine configuration. Corresponding to the specifically shown front-engine configuration of the vehicle 10, the hood panel 44 is depicted as arranged generally proximate the front end 16, while the trunk lid 48 is arranged generally proximate the rear end 18.

Figure 2:
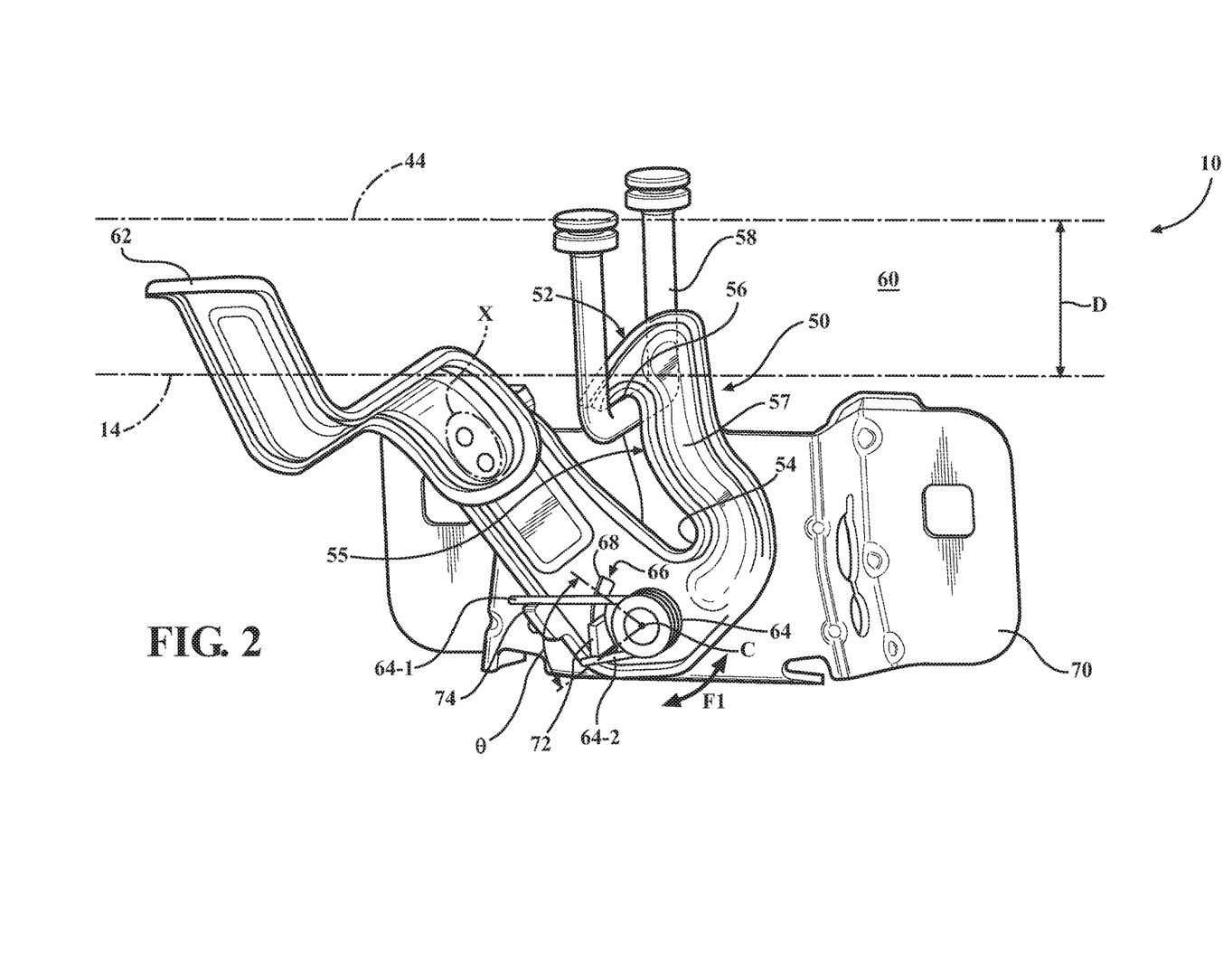
FIG. 2 is a schematic close-up perspective partial view of the vehicle shown in FIG. 1 from the perspective of a vehicle fascia, including a view of a mechanism having a pivotable latch configured to fasten the hood panel to a body of the vehicle, the mechanism shown in a first position.

The vehicle 10 also includes a mechanism 50 (shown in FIG. 2) configured to fasten the hood panel 44 to the vehicle body 14 such that the hood panel maintains closure of the compartment 40. FIG. 2 illustrates the mechanism 50 from the perspective of the vehicle fascia 42. As shown in FIG. 2, the mechanism 50 includes a pivotable latch 52 having a primary catch portion 54 configured to facilitate or maintain closure of the under-hood compartment 40A via the hood panel 44 being pulled against the vehicle body 14. The pivotable latch 52 also includes a secondary catch portion 56 configured to limit, such as constrain and/or maintain, the position of the hood panel 44 within a predetermined distance D from the vehicle body 14. Such limiting of the position of the hood panel 44 by the secondary catch portion 56 within the predetermined distance D of the vehicle body 14 is configured to generate an opening 60 between the vehicle body and the hood panel. As shown in FIGS. 2-5, the mechanism 50 may additionally include a striker 58 configured to cooperate with the latch 52. The position of the hood panel 44 is specifically limited to within the predetermined distance D by an engagement between the secondary catch portion 56 and the striker 58 (shown in FIG. 2).

The pivotable latch 52 also includes a release handle portion 62 configured to be shifted into the opening 60 between the vehicle body 14 and the hood panel 44. The release handle portion 62 is configured as a lever for shifting the secondary catch portion 56 out of position where it traps the striker 58. The previously described engagement between the secondary catch portion 56 and the striker 58 (shown in FIG. 2) also permits the release handle portion 62 to be exposed for access within the opening 60. Accordingly, the opening 60 is configured to provide access to the release handle portion 62 by an operator, such as a vehicle maintenance technician, and facilitate a release of the secondary catch portion 56 to uncover the under-hood compartment 40A via the hood panel 44. As may be seen in FIG. 2, the mechanism 50 also includes a first resilient element 64, such as a clock spring, configured to operate bi-directionally to selectively preload the primary catch portion 54 in opposing directions via a force F1.

Figure 3:
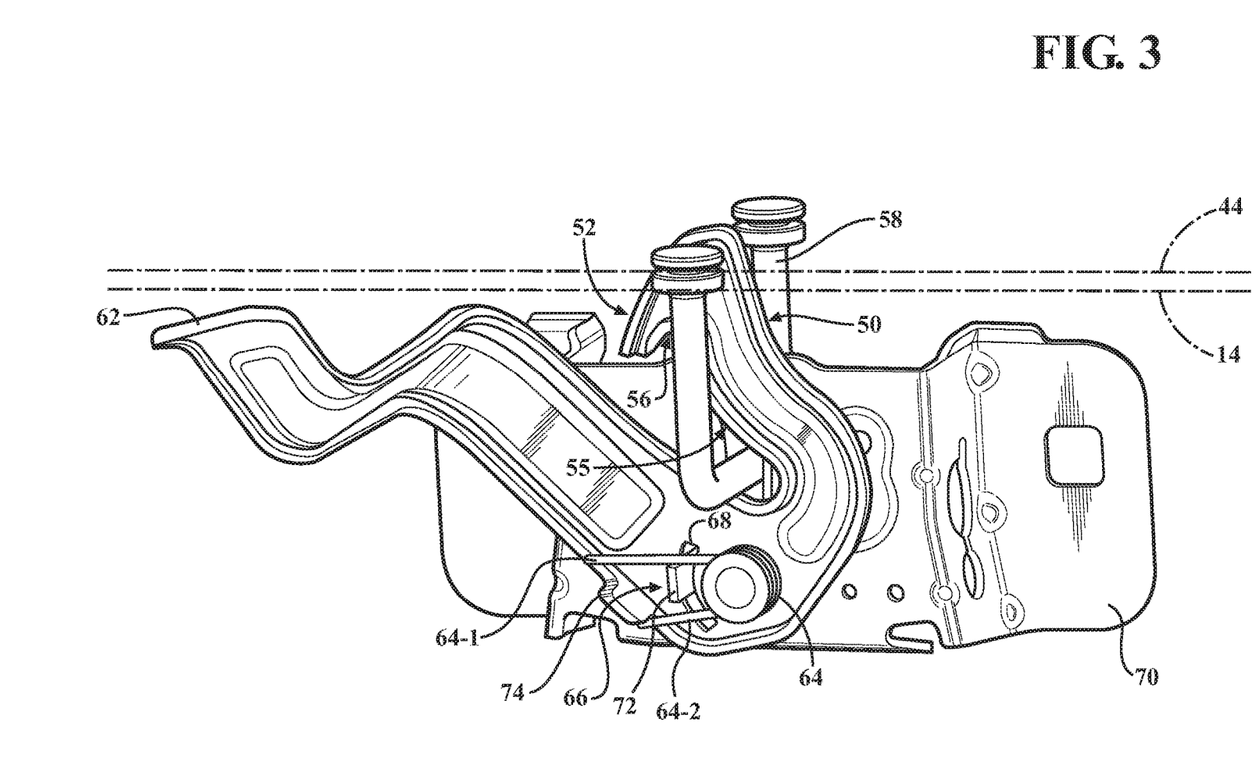
FIG. 3 is a schematic close-up partial perspective view of the mechanism shown in FIG. 2, the mechanism shown in a second position.
Figure 4:
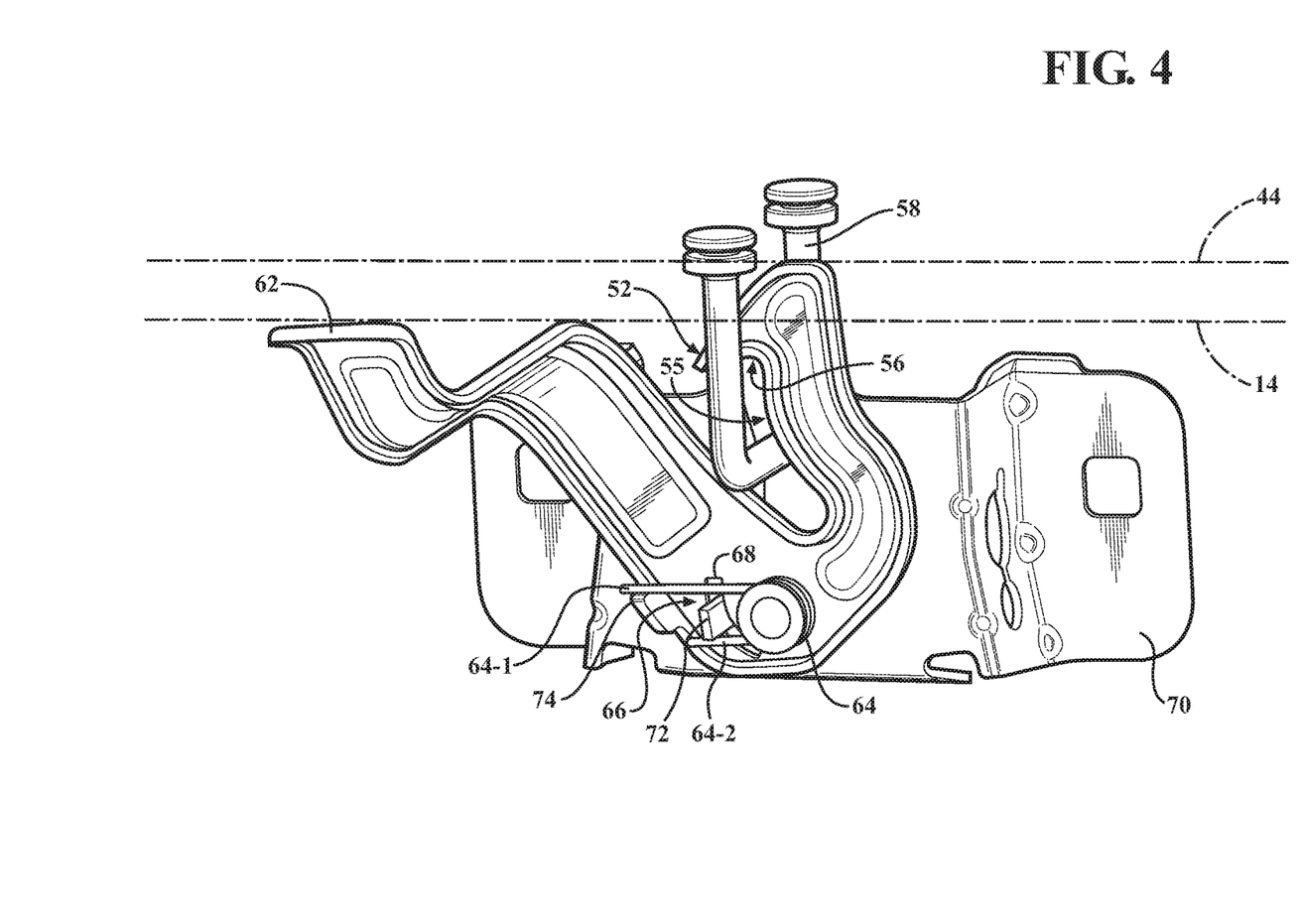
FIG. 4 is a schematic close-up partial perspective view of the mechanism shown in FIG. 2, the mechanism shown in a third position.

Specifically, the first resilient element 64 may be configured, i.e., designed, constructed, and mounted, such that, depending on the position of the latch 52, the force F1 may be applied in one direction, or another, opposite direction. As shown in FIG. 3, the force F1 is applied in a first, such as clockwise (CW), direction to maintain the primary catch portion 54 in a latched state to facilitate closure of the under-hood compartment 40A via the hood panel 44. As shown in FIG. 4, the force F1 is applied in a second, such as counterclockwise (CCW), direction, to facilitate contact between the secondary catch portion 56 and the striker 58 for maintaining the hood panel 44 within the predetermined distance D from the vehicle body 14.

The primary catch portion 54 and the secondary catch portion 56 may be arranged non-linearly with respect to the pivot center C. In other words, the pivot center C, the practical center of the primary catch portion 54, and the practical center of the secondary catch portion 56 do not lie on the same straight line. Such an arrangement may be employed to further facilitate appropriate presentation of the release handle portion 62 into the opening 60 between the body 14 and the hood 44. As shown in FIG. 2, the primary catch portion 54 and the secondary catch portion 56 may be formed together as a first component 57, while the release handle portion 62 is separately formed as a second component. Furthermore, the first component may then be fixed to, i.e., interconnected with, the second component or the release handle portion 62 at an interface X, and thereby combined into a unitary latch structure as shown in FIG. 3. Alternatively, as shown in FIGS. 3-4, the primary catch portion 54, the secondary catch portion 56, and the release handle portion 62 may be formed together as a single, continuous latch structure.

As shown in FIGS. 2-4, the mechanism 50 may also include a limiter 66 configured to define a range of motion, for example, restrict a range of rotation or articulation, of the latch 52, and specifically of the release handle portion 62. As shown, the limiter 66 may include a slot 68 having an arc configured to define a predetermined angle θ of rotation for the latch 52 relative to a pivot center C. As shown, the slot 68 may be defined by the latch 52. The mechanism 50 is mounted to a housing 70, while the housing is in turn fixed to the vehicle body 14. The housing 70 includes a first tab 72 configured to extend through the arcuate slot 68. The rotation of the latch 52 is configured to shift the first tab 72 within the slot 68, and thereby define the angle θ via an outer periphery of the slot coming in contact with the first tab and stopping the relative movement of the first tab relative to the slot.

The latch 52 includes a second tab 74. The spring 64 includes two individual ends or tangs 64-1 and 64-2 that are acted on to generate the force F1 as the latch 52 is articulated through its range of movement. As shown, the first tab 72 is positioned between the tangs 64-1 and 64-2 of the spring 64. Similarly, the second tab 74 is also positioned between the tangs 64-1 and 64-2. Accordingly, the tangs 64-1 and 64-2 extend on opposite sides, and thereby bracket each of the first tab 72 and the second tab 74. Depending on the position of the latch 52 relative to the housing 70, the spring 64 may be in a neutral position, in which the tangs 64-1, 64-2 are not loaded by either the first tab 72 or the second tab 74, or in one of two preloaded positions, where the spring applies the force F1 to the latch. When each of the first tab 72 and the second tab 74 are aligned within a space between the two tangs 64-1 and 64-2, the spring 64 is in a neutral position. When the first tab 72 and the second tab 74 gradually shift out of alignment as the latch 52 is articulated, the two tangs 64-1 and 64-2 are spread apart and the spring 64 commences to exert the force F1. Accordingly, in the neutral position, the spring 64 does not apply force F1 to the latch 52, while in one of the two preloaded positions the spring urges the latch in either the first (CW) direction by the second tab 74, or in the second (CCW) direction by the first tab 72.

The striker 58 is further configured to cooperate with the latch 52 to selectively shift the release handle portion 62 into the opening 60 between the vehicle body 14 and the hood panel 44. The contour of the latch 52 may define a surface 55. As shown, the surface 55 is arranged between and connecting the primary catch portion 54 and the secondary catch portion 56. The surface 55 may define a curved path for contact with the striker 58. The surface 55 is configured to guide the latch 52, such as by establishing or defining a rotational path or motion thereof, via contact with the striker 58. Consequently, the surface 55 is configured to position the release handle portion 62 within the opening 60 between the vehicle body 14 and the hood panel 44 for the access to the release handle portion by the operator, as noted above. Furthermore, actuation of the release handle portion 62 is configured to shift the secondary catch portion 56 away from to thereby clear the striker 58. As shown in FIGS. 2-4, the housing 70 is fixed to the vehicle body 14. The pivotable latch 52, along with the first resilient element 64, may be mounted to the housing 70 via a fastener, such as a rivet.

Figure 5:
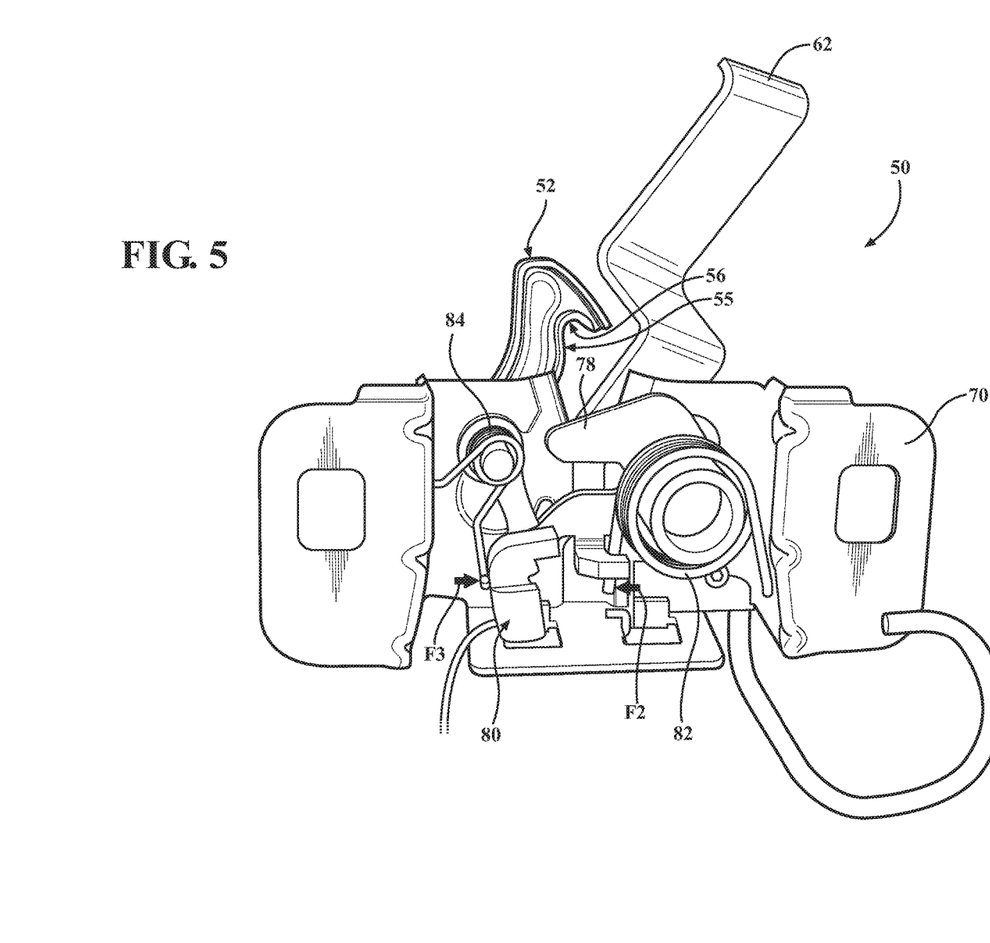
FIG. 5 is a schematic close-up partial perspective view of the mechanism shown in FIG. 2, the mechanism shown in the first position from the perspective of a vehicle passenger compartment.

FIG. 5 illustrates the mechanism 50 from its backside, i.e., from the perspective of the passenger compartment 27. As shown in FIG. 5, the mechanism 50 may also include a fork bolt 78 configured to capture the striker 58 and thereby fasten the hood panel 44 to the vehicle body 14. The mechanism may 50 additionally include a device 80 configured to release the fork bolt 78. For example, the device 80 may be a cable, lever with a catch, and/or a solenoid actuated by the operator of the vehicle 10. The release of the fork bolt 78 is intended to free the hood panel 44 for separation from the vehicle body 14 by the predetermined distance D, and thereby establish the opening 60 between the vehicle body and the hood panel. Such release of the fork bolt 78 may be accomplished remotely from the vehicle's passenger compartment 27. As also shown in FIG. 5, the mechanism 50 may additionally include a second resilient element 82, which may be configured as a clock spring. The second resilient element 82 is configured to apply a second preload force F2 directed to shift the fork bolt 78 to a position where the fork bolt releases the striker 58 and permits the hood panel 44 to move away from the vehicle body 14. The fork bolt 78 along with the second resilient element 82 may be mounted to housing 70 via a suitable fastener.

The mechanism 50 may further include a third resilient element 84. As shown, the third resilient element 84 is configured to apply a third preload force F3 to at least a portion of the device 80. The third force F3 directed to maintain the fork bolt 78 in position of capturing the striker 58, such that the hood panel 44 remains pulled against the vehicle body 14. The release of the fork bolt 78 via the device 80 against the action of the third resilient element 84, together with the application of the first force F1 to the latch 52 in the second direction, causes the release handle portion 62 to automatically shift, for example swing or pivot, into the opening 60 between the vehicle body 14 and the hood panel 44. Furthermore, once the release handle portion 62 has shifted into the opening 60, the operator is provided with appropriate access to the release handle portion for freeing the secondary catch portion 56 from engagement with the striker 58 and enabling the operator to uncover the compartment 40.

As may be seen from the FIGS. 2-4, during operation of the hood 44, a mass of the hood forces through the hood striker 58 to rotate the latch 52 along with the secondary catch portion 56 clockwise about the pivot center C. At this instance, the spring 64 generates the force F1 on the latch 52 in the counterclockwise direction via the first tang 64-1 and the second tang 64-2 being spread by the relative movement of the first tab 72 and the second tab 74. The force F1 generated by the spring 64 is overcome by hood 44 mass and gravity. Once the striker 58 passes the secondary catch portion 56, the striker engages the primary catch portion 54 and drives the counterclockwise rotation of the latch 52 along with the release handle portion 62. Next, the spring 64 loads the latch 52 by the force F1 in the clockwise direction via the first tang 64-1 and the second tang 64-2 being spread by the relative movement of the first tab 72 and the second tab 74. As the striker 58 is forced further toward the body 14, the striker is captured and becomes fully secured by the fork bolt 78.

The fork bolt 78 may be released via the device 80 actuated by the operator. Following such release of the fork bolt 78, the second resilient element 82 rotates the fork bolt, releases striker 58, and forces the striker toward the secondary catch portion 56. The release of the striker 58 toward the secondary catch portion 56 rotates the release handle portion 62 clockwise about the pivot center C until the release handle portion 62 is presented into the opening 60 between the body 14 and the hood 44. The spring 64 maintains the surface 55 against striker 58, while the secondary catch portion 56 prevents the striker from lifting until the release handle portion 62 is accessed within the opening 60 and further actuated by the operator.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A vehicle comprising:
   a vehicle body defining a compartment;
   a hood panel configured to cover the compartment and thereby define an under-hood compartment; and
   a mechanism configured to fasten the hood panel to the vehicle body such that the hood panel maintains closure of the compartment and having a pivotable latch and a first resilient element;

wherein:
the pivotable latch includes:
a primary catch portion configured to facilitate closure of the under-hood compartment via the hood panel;
a secondary catch portion configured to limit a position of the hood panel within a predetermined distance from the vehicle body and thereby generate an opening between the vehicle body and the hood panel; and
a release handle portion configured to be shifted into the opening between the vehicle body and the hood panel to provide access to the release handle portion by an operator and facilitate a release of the secondary catch portion to uncover the under-hood compartment via the hood panel; and
the first resilient element is configured to selectively preload the primary catch portion to facilitate closure of the under-hood compartment and preload the secondary catch portion to limit the position of the hood panel within the predetermined distance from the vehicle body.

2. The vehicle of claim 1, wherein the primary catch portion and the secondary catch portion are formed together as a first component, the release handle portion is formed as a second component, and the first component is fixed to the second component and thereby combined into a unitary latch structure.

3. The vehicle of claim 1, wherein the primary catch, the secondary catch, and the release handle portions are formed together as a single, continuous latch structure.

4. The vehicle of claim 1, wherein the mechanism additionally includes a limiter configured to define a range of motion of the latch.

5. The vehicle of claim 4, wherein:
the mechanism additionally includes a striker configured to cooperate with the latch to selectively shift the release handle portion into the opening between the vehicle body and the hood panel;
the latch includes a surface arranged between the primary and secondary catch portions and configured to guide the latch via contact with the striker to thereby position the release handle portion in the opening between the vehicle body and the hood panel; and
the release handle portion is configured such that actuating the release handle portion shifts the secondary catch portion away from the striker.

6. The vehicle of claim 5, wherein the mechanism additionally includes:
a fork bolt configured to capture the striker and thereby fasten the hood panel to the vehicle body; and
a device configured to release the fork bolt and thereby free the hood panel to separate from the vehicle body by the predetermined distance and generate the opening between the vehicle body and the hood panel.

7. The vehicle of claim 6, wherein the mechanism additionally includes a second resilient element configured to apply a preload force directed to maintain the fork bolt in position to fasten the hood panel to the vehicle body.

8. The vehicle of claim 7, wherein the release handle portion is shifted into the opening between the vehicle body and the hood panel automatically via release of the fork bolt.

9. A mechanism configured to fasten a hood panel to a vehicle body for covering an under-hood compartment defined by the vehicle body, the mechanism comprising:

a pivotable latch; and
a first resilient element;
wherein:
the pivotable latch includes:
a primary catch portion configured to facilitate closure of the under-hood compartment via the hood panel;
a secondary catch portion configured to limit a position of the hood panel within a predetermined distance from the vehicle body and thereby generate an opening between the vehicle body and the hood panel; and
a release handle portion configured to be shifted into the opening between the vehicle body and the hood panel to provide access to the release handle portion by an operator and facilitate a release of the secondary catch portion to uncover the under-hood compartment via the hood panel; and
the first resilient element is configured to selectively preload the primary catch portion to facilitate closure of the under-hood compartment and preload the secondary catch portion to limit the position of the hood panel within the predetermined distance from the vehicle body.

10. The mechanism of claim 9, wherein the primary catch portion and the secondary catch portion are formed together as a first component, the release handle portion is formed as a second component, and the first component is fixed to the second component and thereby combined into a unitary latch structure.

11. The mechanism of claim 9, wherein the primary catch, the secondary catch, and the release handle portions are formed together as a single, continuous latch structure.

12. The mechanism of claim 9, further comprising a limiter configured to define a range of motion of the latch.

13. The mechanism of claim 9, wherein:
the mechanism additionally includes a striker configured to cooperate with the latch to selectively shift the release handle portion into the opening between the vehicle body and the hood panel;
the latch includes a surface arranged between the primary and secondary catch portions and configured to guide the latch via contact with the striker to thereby position the release handle portion in the opening between the vehicle body and the hood panel; and
the release handle portion is configured such that actuating the release handle portion shifts the secondary catch portion away from the striker.

14. The mechanism of claim 13, further comprising:
a fork bolt configured to capture the striker and thereby fasten the hood panel to the vehicle body; and
a device configured to release the fork bolt and thereby free the hood panel to separate from the vehicle body by the predetermined distance and generate the opening between the vehicle body and the hood panel.

15. The mechanism of claim 14, further comprising a second resilient element configured to apply a preload force directed to maintain the fork bolt in position to fasten the hood panel to the vehicle body.

16. The mechanism of claim 15, wherein the release handle portion is shifted into the opening between the vehicle body and the hood panel automatically via release of the fork bolt.

17. A vehicle comprising:
a vehicle body defining a compartment;
a hood panel configured to cover the compartment and thereby define an under-hood compartment; and a mechanism configured to fasten the hood panel to the vehicle body such that the hood panel maintains closure of the compartment and having a pivotable latch, a first resilient element, and a striker;

wherein:

the pivotable latch includes:

a primary catch portion configured to facilitate closure of the under-hood compartment via the hood panel;

a secondary catch portion configured to limit a position of the hood panel within a predetermined distance from the vehicle body and thereby generate an opening between the vehicle body and the hood panel; and a release handle portion configured to be shifted into the opening between the vehicle body and the hood panel to provide access to the release handle portion by an operator and facilitate a release of the secondary catch portion to uncover the under-hood compartment via the hood panel; and the first resilient element is configured to selectively preload the primary catch portion to facilitate closure of the under-hood compartment and preload the secondary catch portion to limit the position of the hood panel within the predetermined distance from the vehicle body;

the striker is configured to cooperate with the latch to selectively shift the release handle portion into the opening between the vehicle body and the hood panel;

the latch includes a surface arranged between the primary and secondary catch portions and configured to guide the latch via contact with the striker to thereby position the release handle portion in the opening between the vehicle body and the hood panel; and the release handle portion is configured such that actuating the release handle portion shifts the secondary catch portion away from the striker.

18. The vehicle of claim 17, wherein the primary catch and the secondary catch portions are formed together as a first component, the release handle portion is formed as a second component, and the first component is fixed to the second component and thereby combined into a unitary latch structure.

19. The vehicle of claim 17, wherein the primary catch, the secondary catch, and the release handle portions are formed together as a single, continuous latch structure.

20. The vehicle of claim 17, wherein the mechanism additionally includes:

a fork bolt configured to capture the striker and thereby fasten the hood panel to the vehicle body;

a device configured to release the fork bolt and thereby free the hood panel to separate from the vehicle body by the predetermined distance and generate the opening between the vehicle body and the hood panel; and a second resilient element configured to apply a preload force directed to maintain the fork bolt in position to fasten the hood panel to the vehicle body.

* * * * *